(12) United States Patent
Pamp et al.

(10) Patent No.: US 8,929,959 B2
(45) Date of Patent: Jan. 6, 2015

(54) METHOD AND A DEVICE FOR RECEIVING DATA IN A MOBILE COMMUNICATION DEVICE IN A BROADCAST SYSTEM

(75) Inventors: Johan Pamp, Svedala (SE); Leif Wilhelmsson, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1427 days.

(21) Appl. No.: 12/597,217

(22) PCT Filed: Mar. 13, 2008

(86) PCT No.: PCT/EP2008/053024
§ 371 (c)(1),
(2), (4) Date: Jun. 19, 2012

(87) PCT Pub. No.: WO2008/128828
PCT Pub. Date: Oct. 30, 2008

(65) Prior Publication Data

US 2010/0144326 A1    Jun. 10, 2010

Related U.S. Application Data

(60) Provisional application No. 60/916,904, filed on May 9, 2007.

(30) Foreign Application Priority Data

Apr. 24, 2007  (EP) ..................................... 07388025

(51) Int. Cl.
| | |
|---|---|
| H04M 1/00 | (2006.01) |
| H04B 7/00 | (2006.01) |
| H04W 76/00 | (2009.01) |
| G08G 1/00 | (2006.01) |
| G08B 25/08 | (2006.01) |

(52) U.S. Cl.
CPC ............. *H04W 76/007* (2013.01); *G08G 1/202* (2013.01); *G08B 25/08* (2013.01)
USPC ......................................... 455/574; 455/522

(58) Field of Classification Search
CPC ............................... H04W 52/02; H04W 52/30
USPC ........ 455/3.01, 3.02, 3.03, 414.1, 414.2, 572, 455/573, 574, 522
See application file for complete search history.

(56) References Cited

U.S. PATENT DOCUMENTS 5,998,972 A * 12/1999 Gong ............................ 320/134
6,954,652 B1 * 10/2005 Sakanashi .................. 455/550.1

(Continued)

FOREIGN PATENT DOCUMENTS

| EP | 1696575 A1 | 8/2006 |
|---|---|---|
| EP | 1724939 A1 | 11/2006 |

(Continued)

OTHER PUBLICATIONS

Herrero C. et al: "Delivery of Digital Television to Handheld Devices" Wireless Communication Systems, 2004, pp. 240-244, 1st Int'l. Symposium on Mauritius.

*Primary Examiner* — Christopher M Brandt
(74) *Attorney, Agent, or Firm* — Roger S. Burleigh

(57) ABSTRACT

In a method for receiving data in a mobile communication device in a broadcast system in which an amount of data is transmitted; said mobile communication device comprising a battery; wherein the method comprises the step of receiving a part of said amount of data, wherein the method further comprises the step of determining said part of said amount of data based on a charge state of the battery. In this way, the mobile communication device is able to download/receive an amount of data in dependence to an actual condition experienced by said mobile communication device. A condition of the mobile communication device may, in this context be, for example, a reception condition, a power consumption condition, a battery capacity condition, or a battery charging condition.

31 Claims, 4 Drawing Sheets

(56) References Cited

U.S. PATENT DOCUMENTS

| | | | |
|---|---|---|---|
| 2004/0204181 A1* | 10/2004 | Cromer et al. | 455/574 |
| 2005/0047382 A1* | 3/2005 | Park et al. | 370/338 |
| 2005/0174483 A1 | 8/2005 | Ruckriem | |
| 2006/0034326 A1* | 2/2006 | Anderson et al. | 370/466 |
| 2006/0079268 A1* | 4/2006 | Livet et al. | 455/522 |
| 2006/0125446 A1* | 6/2006 | Tupman et al. | 320/132 |
| 2006/0135195 A1* | 6/2006 | Leinonen et al. | 455/550.1 |
| 2007/0298762 A1* | 12/2007 | Morris | 455/405 |
| 2007/0298836 A1* | 12/2007 | Yanover | 455/552.1 |

FOREIGN PATENT DOCUMENTS

| | | |
|---|---|---|
| GB | 2 403 377 A | 12/2004 |
| JP | H07-95147 A | 4/1995 |
| JP | 2003/152579 A | 5/2003 |
| JP | 2005/311582 A | 11/2005 |

* cited by examiner

METHOD AND A DEVICE FOR RECEIVING DATA IN A MOBILE COMMUNICATION DEVICE IN A BROADCAST SYSTEM

CROSS-REFERENCE TO RELATED APPLICATIONS

This application is a National Stage application, under 35 U.S.C. §371, of International Application No. PCT/EP2008/053024, filed Mar. 13, 2008, which claims the benefit of U.S. Provisional Application No. 60/916,904, filed May 9, 2007, and European Patent Application No. 07388025.4, filed Apr. 24, 2007, the disclosures of which are fully incorporated herein by reference.

TECHNICAL FIELD OF THE INVENTION

The invention relates to a method for receiving data in a mobile communication device in a broadcast system in which an amount of data is transmitted. Further, the invention relates to a corresponding device.

DESCRIPTION OF RELATED ART

Currently, different types of broadcast technologies are made available for mobile phones. One such type of broadcast technology is developed within the traditional cellular standards and is denoted Multimedia Broadcast and Multicast Services (MBMS). Another such type of broadcast technology for mobile phones has emerged from the European broadcasting standard for terrestrial television, digital video broadcasting-terrestrial (DVB-T). This standard is denoted digital video broadcasting-handheld (DVB-H).

Broadcast transmission to mobile phones is, in several ways, different from the point-to-point (P2P) transmission which is used for voice traffic and data traffic, such as for example Short Message Service (SMS) and/or Multimedia Messaging Service (MMS). One difference is that it is difficult to achieve a similar quality-of-service (QoS) in a broadcast system compared to a point-to-point system. For example, in P2P transmission in cellular telecommunication systems it is commonplace to use power control on cellular phones in order to ensure a minimum received power level of a signal to a cellular phone transmitted from a base station and, at the same time, to ensure that the power level of the signal is such that co-channel interference is limited. In addition, in case data is not received correctly during P2P transmission, the data is usually re-transmitted. This is achieved by means of automatic repeat request (ARQ). For broadcast systems, neither power control nor ARQ is used. This means that receiving conditions for the receivers (e.g. cellular phones) addressed by a specific transmitter usually experience very different channel conditions.

In broadcast systems based on DVB-H, a service is transmitted at data rates higher than that required for such a typical service, e.g. a TV program to be viewed on a small, handheld screen/device. For DVB-H, data rates in the order of 10 Mbits/s are commonplace, whereas the services commonly require in the order of 300-400 kbits/s. Thus, in the order of 30 TV programs may in principle be supported on a 10 Mbits/s carrier.

To support more TV programs, radio programs, and/or other broadcast services, more than one transmission frequency may be used, and thereby the receiving device is required to switch to a frequency where a desired service (e.g. TV program) is transmitted.

DVB-H is expected to be made available to mobile phones, laptops, and similar portable devices. Currently, the amount of memory available in these devices is increasing. In particular, a leap in the available memory is encountered in cellular phones when memory cards are introduced. Memory cards of 512 MB are commonplace today, and in the near future, mobile phones may be expected to have memory in excess of 1 GB, for example 4 GB or more. Therefore, it is possible to store photos, MP3 sounds, radio programs, TV programs and other things received via DVB-H or other broadcast services on cellular phones and other portable devices.

In the development of the DVB-H standard, the power consumption related to receiving DVB-T was seen as a major obstacle. Therefore, in the development of DVB-H, one of the things addressed was how to significantly reduce the power consumption without changing coding, modulation and other key characteristics of DVB-T. The solution was the introduction of time-slicing in which data is transmitted in relatively short bursts at a data rate that is significantly higher than needed for a given service. To indicate to a receiver receiving a first burst/time-slice when to expect a second burst/time-slice, the time to the beginning of the second burst/time-slice is indicated within the first burst/time-slice. Thus, a DVB-H receiver of e.g. a cellular phone may essentially be turned off in between the data bursts/time-slices and therefore the average power consumption of the receiver may be reduced. The exact power saving may depend on a plurality of factors, such as for example the relation between the duration of the data bursts/time-slices in which the receiver is turned on and the duration in between the bursts/time-slices in which at least part of the receiver may be turned off. It is commonly envisioned that the power consumption using a time-sliced system may be in the order of 80-90% less than the power consumption using continuous reception.

Typically, one service (for instance a TV program) is transmitted in every time-slice/data burst. The longer the time-interval in which the receiver may be turned off, the larger the power saving. However, too long time-intervals in between the bursts/time-slices have the implication that it may, on average, take longer time to switch from one service to another. The time-interval between a user selects a service, e.g. a television program, until the service is displayed on a display on the user's device, e.g. a mobile telephone, is called zapping time. Consequently, when choosing the time-slicing parameters there is a trade-off between how much power saving can be obtained and the user experience in terms of zapping time.

Additionally, a plurality of services (e.g. TV programs) may be broadcasted in a plurality of time-slices. For example, a 10 Mbit/s carrier may support in the order of thirty 300-400 kbit/s services such as TV programs. The 30 services may be seen as a frame in which each service has its own time-slice. Frames may be sent consecutively such that a first frame comprises a first set of data for each of the 30 services, a second frame may comprise a second set of data for each of the 30 services and so on. A given service may have the same position in each of the frames in which it is transmitted.

For example, a first TV program may be sent in the first time-slice of the frames, said first time-slice occurring at the same position in the consecutively transmitted frames i.e. the first time-slice of each frame. The time-slices of said first TV program are in this example therefore time-slices number 1, 31, 61, 91, etc.

A handheld device receiving said first TV program therefore only needs to receive the abovementioned first time-slice of the frames and thereby the handheld device may obtain a power saving. However, this increased power saving may be at the expense of additional zapping time.

Once there is sufficient memory in a handheld device which is able to receive and store broadcast transmitted information, it is envisioned that typical broadcast services like radio and/or TV will be downloaded and stored in a memory of the handheld device, so that a user may listen and/or watch the downloaded services at a desired time.

In particular, it is envisioned that information with a limited time of interest, e.g. news and/or stock prices, will be frequently updated to be interesting for the user.

A similar situation may occur in a system in which the individual services take up a part of an available bandwidth.

EP 1 696 575 relates to a method for transmitting and a method for receiving data through transmission channels. A selected service is downloaded. During off-time between the time-slices of the selected service, another service is downloaded and from this other service, zapping data is extracted and stored.

In the prior art it is known to download/receive a large part of an amount of data from a broadcast system transmitting an amount of data at the expense of a high energy consumption. Alternatively, it is known to download/receive a small part of an amount of data from the broadcast system at the expense of a low flexibility i.e. when only a small a part of the mount of the data is downloaded it is not possible to use the rest of the amount of data not downloaded/received.

Therefore, one problem with the existing technology is that a mobile communication device receiving a part of an amount of data in a broadcast system, does not receive/download the amount of data in a substantially optimal way.

Therefore, it is an object of the invention to provide a method and a device enabling a mobile communication device in a broadcast system to receive/download an amount of data in a substantially optimal way.

SUMMARY

According to the invention the object is achieved by a method for receiving data in a mobile communication device in a broadcast system in which an amount of data is transmitted; said mobile communication device comprising a battery; wherein the method comprises the step of receiving a part of said amount of data, wherein the method further comprises the step of determining said part of said amount of data based on a charge state of the battery.

Thereby, the invention is able to solve the abovementioned problem by determining the amount of data to be downloaded/received based on a charge state of the battery. Thereby, the mobile communication device is able to download/receive a part of the amount of data in an optimal way. For example, the charge state of the mobile communication device may indicate that download/reception of a large part of the amount of data is acceptable.

The charge state of the battery may, for example, also reflect that one or more conditions to which the mobile communication device may be subjected and thus the one or more conditions experienced by the mobile communication device may be taken into account during reception of data by a mobile communication device in a broadcast system.

Below and above, a condition of the mobile communication device may be, for example, a reception condition, a power consumption condition, a battery capacity condition, a battery charging condition, etc.

In an embodiment of the invention, the step of determining said part of said amount of data based on a charge state of the battery further comprises the steps of determining said part of said amount of data to be equal to a first part of said amount of data, if the charge state of the battery indicates that the battery is connected to a battery charger; and determining said part of said amount of data to be equal to a second part of said amount of data, if the charge state of the battery indicates that the battery is not connected to a battery charger.

In this way, if the mobile communication device is connected to a charger charging the battery of the mobile communication device, then power consumption of the mobile communication device is not an issue and thus the mobile communication device may receive/download a large amount (a first amount) of data.

Further, if the mobile communication device is not being charged and the power consumption of the mobile communication device may be an issue, then the part of said amount of data to be received/downloaded may be lower (a second number). Thereby, if the mobile communication device is not connected to a charger, the mobile communication device may conserve battery power by receiving/downloading a smaller part of the amount of data, Thus, the amount of data received by the mobile communication device may depend on whether the mobile communication device is being charged or whether the mobile communication device is not being charged.

In an embodiment of the invention, the step of determining said part of said amount of data based on a charge state of the battery is based on the amount of remaining battery capacity.

In this way, the method is able to adjust the part of said amount of data to be downloaded to the amount of remaining battery capacity i.e. the method is able to adjust the part of said amount of data to be downloaded to the condition of remaining battery capacity of the mobile communication device.

In an embodiment of the invention, the step of determining said part of said amount of data based on an amount of remaining battery capacity comprises the steps of determining said part of said amount of data to be equal to a third part of said amount of data, if the charge state of the battery indicates that the battery has a remaining capacity higher than or equal to a first amount of its total capacity; and determining said part of said amount of data to be equal to a fourth part of said amount of data if the charge state of the battery indicates that the battery has a remaining capacity lower than said first amount of its total capacity.

In this way, the method is able to determine said part of said amount of data to be downloaded to be a third part of said amount of data if the remaining battery capacity is above a certain first level (e.g. 50%) of the total battery capacity. If the remaining battery capacity is below said first level, a fourth part of said amount of data are downloaded. Thus, if for example the remaining battery capacity is high, the mobile communication device may download/receive a large amount of data, and if for example the remaining battery capacity is low, the mobile communication device may, in order to preserve battery power, download/receive a small amount of data.

In an embodiment of the invention, the determining of said part of said amount of data based on a charge state of the battery is performed in dependence of a power consumption of the device on said battery.

In this way, the method enables the mobile communication device to determine a part of said amount of data to be downloaded in accordance with a power consumption of the mobile communication device and therefore, the method is able to adjust the part of said amount of data to be downloaded to the condition of power consumption of the mobile communication device.

In an embodiment of the invention, the step of determining said part of said amount of data based on a charge state of the battery further comprises the steps of determining said part of said amount of data to be in a first range of parts of said amount of data, said first range comprising a highest value and a lowest value of said first range, if the mobile communication device is in a standby mode indicative of a power consumption below a first value; and determining said part of said amount of data to be in a second range of parts of said amount of data, said second range comprising a highest value and a lowest value of said second range, if the mobile communication device is in an active mode indicative of a power consumption above said first value.

In this way, the method is able to determine the amount of data to be received according to the mode of the mobile communication device.

Alternatively or additionally, if the mobile communication device, for example, has a large power consumption, the mobile communication device may, in order to preserve battery power, determine said part of said amount of data to be small such that the energy consumption associated with the receiving of said part of the amount of data may be reduced/minimized.

If the power consumption of the mobile communication device, for example, is small, then the part of the amount of data determined to be received/downloaded may be high and thus the energy consumption of the mobile communication device may be maintained and/or increased.

In an embodiment of the invention, the method further comprises, if the mobile communication device is in a standby mode, the step of determining said part of said amount of data to be equal to the lowest value of said first range, if a receiver of the mobile communication device is active.

In this way, the method is able to download the lowest number of the first range of parts of said amount of data if the mobile communication device is in a standby mode and a receiver of the mobile communication device is active.

In an embodiment of the invention, the method further comprises, if the mobile communication device is in an active mode, the step of determining said part of said amount of data to be substantially equal to the lowest value in said second range, if a receiver of the mobile communication device is active.

In this way, the method is able to download the lowest number of the second range of parts of said amount of data if the mobile communication device is in an active mode and a receiver of the mobile communication device is active.

In an embodiment of the invention, the determining of said part of said amount of data performed in dependence of a power consumption of the device on said battery further comprises the steps of determining said part of said amount of data to be equal to a fifth part of said amount of data, if the charge state of the battery indicates that the mobile communication device has a power consumption higher than or equal to a second power consumption; and determining said part of said amount of data to be equal to a sixth part of said amount of data, if the charge state of the battery indicates that the mobile communication device has a power consumption below said second power consumption.

In this way, the method enables the mobile communication device to determine a part of said amount of data to be downloaded in accordance with a condition, the condition being the power consumption of the mobile communication device. Thereby, the method enables the mobile communication device to e.g. determine said part of said amount of data to be a large amount of data if the power-consumption of the mobile communication device is low.

And if the power consumption of the mobile communication device is high, then e.g. determine said part of said amount of data to be a low amount of data. Thus, if the mobile communication device has a large power consumption, the power consumption of a receiver receiving a number of time-slices may be reduced by determining the part of said amount of data to be low.

In an embodiment of the invention, the method comprises using a signal to noise ratio of the data received by the mobile communication device from the broadcast system as an indication of the power consumption of said mobile communication device.

In this way, the condition on which the method may determine the part of said amount of data to download may be the signal to noise ratio of the data received by the mobile communication device. For example, the better the reception conditions, the higher the signal to noise ratio and thus the lower the power consumption of e.g. a decoder (for example a Reed-Solomon) decoding the digital broadcast signal from the broadcast system and thus the lower the power consumption of the mobile communication device. The lower the general power consumption of the mobile communication device is, e.g. the power consumption not related to the reception/downloading of the part of the amount of data, the higher the power consumption of a receiver of the mobile communication device receiving data may be before e.g. a certain power consumption level is reached.

In an embodiment of the invention, the method further comprises the step of storing said received part of said amount of data in a memory device of said mobile communication device.

In this way, the method enables the mobile communication device to store downloaded/received part of said amount of data in a memory device for later use.

In an embodiment of the invention, the method further comprises the step of determining said part of said amount of data based on a charge state of the battery is further based on statistical data representing a service-switching behaviour of a user using said mobile communication device.

In this way, the zapping-time experienced by the user may be reduced by, based on statistical data of the user's service-switching, downloading/receiving a part of the amount of data in response to the actual service-switching of the user.

In an embodiment of the invention, the amount of data is transmitted as time-slices and said part of said amount of data is a number of time-slices.

In this way, time-sliced systems may be facilitated by the method. Further, the zapping-time between different services in different time-slices may be reduced for a mobile communication device subjected a plurality of conditions because the method may optimize the number of time-slices to be received to the actual condition of the mobile communication device.

In an embodiment of the invention, the broadcast system is a Digital Video Broadcast-Handheld system.

In this way, a DVB-H system may be facilitated by the method.

In an embodiment of the invention, the amount of data is transmitted as an amount of bandwidth and said part of said amount of data is an amount of bandwidth.

In this way, bandwidth based systems may be facilitated by the method.

In an embodiment of the invention, the broadcast system is an Orthogonal Frequency-Division Multiplexing (OFDM) system.

In this way, an OFDM system may be facilitated by the method.

Embodiments of the present invention also relates to a device corresponding to embodiments of the method.

As mentioned, the invention also relates to a device for receiving data in a broadcast system in which an amount of data is transmitted; said device comprising a battery and means for receiving a part of said amount of data; wherein the device further comprises means adapted to determine said part of said amount of data based on a charge state of the battery.

The device and embodiments thereof correspond to the method and embodiments thereof and have the same advantages for the same reasons.

BRIEF DESCRIPTION OF THE DRAWINGS

The invention will now be described more fully below with reference to the drawings, in which.

DETAILED DESCRIPTION OF EMBODIMENTS

Figure 1:
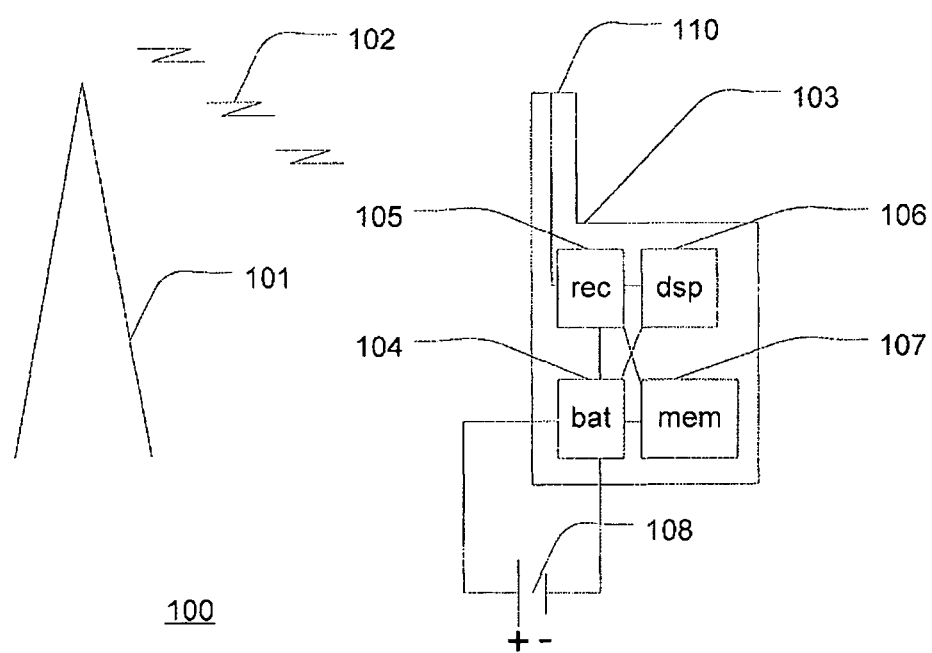
FIG. 1 shows a digital broadcast system comprising a device according to the invention.

FIG. 1 shows a digital broadcast system 100 comprising a digital broadcast transmitter 101 transmitting one or more digital broadcast signals 102. The digital broadcast transmitter 101 may, for example, transmit the one or more digital broadcast signals 102 according to the DVB-H standard. Alternatively or additionally, the digital broadcast transmitter 101 may, for example, transmit the one or more digital broadcast signals 102 according to the Multimedia Broadcast and Multicast Services (MBMS). Alternatively or additionally, the digital broadcast transmitter 101 may transmit the one or more digital broadcast signals 102 according to any modulation and/or coding scheme.

Figure 2:
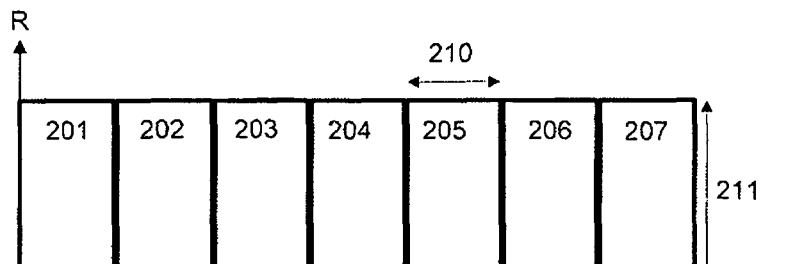
FIG. 2 shows a schematic illustration of a DVB-H time-slicing transmission.
Figure 2:
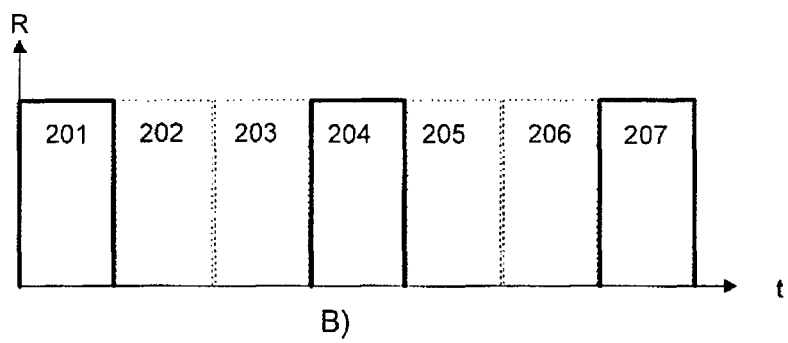
Figure 2:
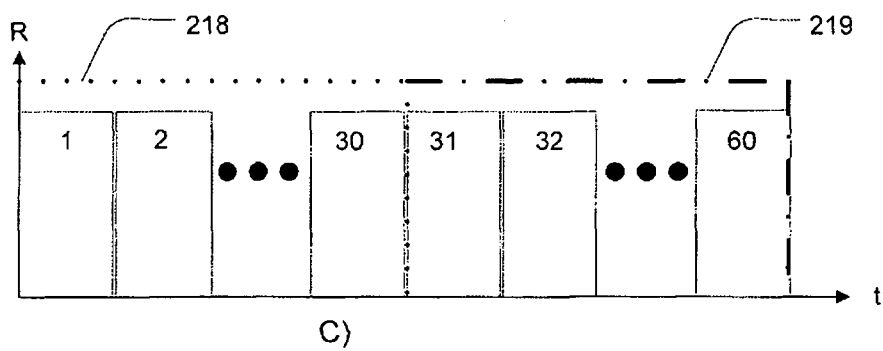

The one or more digital broadcast signals 102 transmitted by the transmitter may, for example, comprise one or more time-slices, 201, 202, 203, 204, 205, 206, 207, as schematically illustrated in FIG. 2 A). In FIG. 2, the axis R is an axis representing a data-rate and the axis t is an axis representing the time. A time-slice may be a data-burst. In a time-slice, e.g. 205, data may be transmitted during a short time period 210 at a high data-rate 211.

Further, a digital broadcast signal 102, for example transmitted at a given frequency, may comprise one or more services such as for example one or more TV programs, one or more radio programs, a combination of TV and radio programs, etc. For example, a 10 Mbit/s carrier frequency may support in the order of thirty 300-400 kbit/s services such as TV programs. The 30 services may be seen as a frame, 218 and 219 in FIG. 2 C), in which each service has its own time-slice i.e. in this example a frame may comprise 30 time-slices. However, any number of time-slices in a frame is possible.

Frames such as 218 and 219 in FIG. 2 C) may be sent consecutively such that a first frame 218 comprises a first set of data for each of the 30 services, a second frame 219 may comprise a second set of data for each of the 30 services and so on. A given service may have the same position in each of the frames in which it is transmitted such that, for example, a first service, e.g. a TV program, may e.g. be transmitted in the first time-slice of each frame i.e. in time-slices number 1, 31, etc. A second service, for example a second TV program, may e.g. be transmitted in the second time-slice of each frame i.e. in time-slices number 2, 32, etc.

Alternatively or additionally, a time-slice may comprise a plurality of services. For example, a frame may comprise a first time-slice comprising a TV-program and a second time-slice comprising plurality of radio-programs and/or a third time-slice comprising a TV-program and at least one radio program and so on.

The digital broadcast system 100 may further comprise a device 103 for receiving the one or more digital broadcast signals 102 such as for example a device according to an embodiment of the present invention. The device 103 may receive the one or more transmitted digital broadcast signals 102 from the digital broadcast transmitter 101 via an antenna 110.

The antenna 110 may be any type of antenna such as for example a dipole antenna, a magnetic loop antenna, a micro-strip antenna and/or an antenna array.

The received digital broadcast signals may be supplied from said antenna 110 to means 105 for downloading a number of time-slices. The means for downloading a number of time-slices may, for example, be a DVB-H receiver. Alternatively, the means 105 for downloading a number of time-slices may be any type of receiver capable of receiving digital broadcast data-bursts/time-slices.

The device 103 may further comprise one or more batteries 104 such as for example a Lithium-ion battery and/or a Nickel-metal-hydride battery and/or Lithium-polymer battery. Alternatively, the one or more batteries 104 of the device 103 may comprise one or more of any types of batteries.

The device 103 may, depending on e.g. a charge state of the battery 104, determine how many time-slices to receive. In FIG. 2B), the device 103 has determined to download three time-slices, namely the time-slices 201, 204 and 207 transmitted by the transmitter 102. In the Figure, the device 103 receives time-slices 201, 204 and 207. After reception of a time-slice/data-burst, e.g. 201, 204 and 207, i.e. during the time-period of the time-slices not to be received by the device, the receiver may have an off-time corresponding approximately to the duration of the time-slices not received, i.e. time-slices 202, 203, 205 and 206. There is a small synchronization time which requires the receiver 105 of the device 103 to be turned on a short time before the time-slices 201, 204 and 207 to be received are arriving. Thus, the device 103 may turn the means 105 for receiving a number of time-slices off during the off-times 202, 203, 205 and 206 thus conserving power of a battery 104 of the device.

The data-rate at which the digital broadcast signals 102 may be transmitted, may e.g. be 10 Mbit/s. The duration of a time-slice may, for example, be in the order of 200 ms, while the time-off period may be in the order of seconds. Alternatively, the duration of a time-slice may be any length of time. Further alternatively, the time-off period may be any length of time.

The longer the off-time 202 in relation to the on-time 201, the longer the means for receiving a number of time-slices 105 may be turned off in relation to the time in which the means 105 is turned on, and thus resulting in a larger power saving on the device 103. However, longer off-times 202 between the time-slices 205, 206 may result in longer switching times when switching from a first service in a first time-slice to a second service in a second time-slice, the so-called zapping time.

The device 103 may further comprise means 106 adapted to determine a number of time-slices to be downloaded based on a charge state of the battery. Said means 106 may, for example, comprise a digital signal processor (DSP) connected, either directly or indirectly, to the battery 104. The DSP may monitor a status of the battery 104. The DSP may further be programmed to determine the number of time-slices to be downloaded based on a measured status value of the battery such as, for example, remaining battery capacity, power consumption, etc.

In an additional embodiment of the invention, the means adapted to determine a number of time-slices to be downloaded based on a charge state of the battery 106 may further be adapted to detect if the battery 104 of the device 103 is being charged i.e. whether the mobile communication device is connected to a battery charger (108).

If the means 106 detects that the battery is being charged, the number of time-slices to be downloaded may, for example, be determined to be all time-slices. The means 106 may therefore supply the number of time-slices to be downloaded to the means 105 for downloading a number of time-slices via e.g. an electrical connection and thus the device 103 may substantially download all time-slices transmitted by the transmitter 101. This may be achieved e.g. by allowing the means 105 for downloading a number of time-slices to be substantially permanently on. If the battery 104 of the device 103 is being charged, power consumption of the means 105 for downloading a number of time-slices and of the device 103 may be considered not to be an issue. The downloaded time-slices may be stored in a memory 107. When all time-slices are determined to be downloaded, the zapping time between the services may be negligible because all time-slices of the last frame are in the memory 107 of the device 103 and may therefore be recalled almost instantaneously from the memory 107.

If the means 106 detects that the battery is not being charged, i.e. the mobile communication device is not connected to a battery charger, then the number of time-slices to be downloaded may be set to a value different from all time-slices. If the battery 104 of the device 103 is not being charged, power consumption of the means 105 for downloading a number of time-slices and of the device 103 may be considered to be an issue. Thus, it may be advantageous to allow the means 105 for downloading a number of time-slices to be substantially off in periods. Thus, in case the mobile communication device is not connected to a battery charger, the number of time-slices to be downloaded may be determined to be e.g. two time-slices, e.g. the first and second time-slices of each received frame.

In an additional embodiment, the means 106 adapted to determine a number of time-slices to be downloaded based on a charge state of the battery 104 may further be adapted to determine a remaining battery capacity. If the means 106 determines that the remaining capacity of the battery is, for example, above a first limit (e.g. the remaining capacity of the battery is above 75% of the total battery capacity) then the means 106 may e.g. determine to download the first two time-slices of each received frame e.g. number 1 and 2, 11 and 12, 21 and 22, etc. The determined number of time-slices to be downloaded may be supplied from the means 106 for determining a number of time-slices to the means 105 for downloading a number of time-slices, e.g. via an electrical connection. The means 105 will then download the determined number of time-slices.

If the means 106 determines that the remaining capacity of the battery is, for example, below the first limit and above a second limit (e.g. the remaining capacity of the battery is below 75% and above 50% of the total battery capacity) then the means 106 may for example determine the number of time-slices to download to be time-slices number 1, 11, and 21, etc. The determined number of time-slices to download may be supplied from the means 106 for determining a number of time-slices to the means 105 for downloading a number of time-slices in which the determined number of time-slices may be downloaded.

If the means 106 determines that the remaining capacity of the battery 104 is, for example, below the second limit (e.g. the remaining capacity of the battery is below 50% of the total battery capacity) then the means 106 may for example determine the number of time-slices to be downloaded to be zero time-slices. The determined number of time-slices to download may be supplied from the means 106 for determining a number of time-slices to the means 105 for downloading a number of time-slices. Thereby, the power consumption of the device 103 may be reduced when the battery capacity of the device is, for example, below a certain limit.

In an additional embodiment, the means adapted to determine a number of time-slices to be downloaded based on a charge state of the battery 106 may further be adapted to depend on a power consumption of said battery.

If, for example, the means 106 determines that the device 103 is in a standby mode and thus that the power consumption of said battery is low (e.g. below a first value), then the means 106 may determine the number of time-slices to be downloaded to be e.g. the first two time-slices of each frame e.g. corresponding to number 1 and 2, 11 and 12, 21 and 22, etc. The determined number of time-slices to be downloaded may be supplied from the means 106 for determining a number of time-slices to be downloaded to the means 105 for downloading a number of time-slices, e.g. via an electrical connection, in which the determined number of time-slices may be downloaded.

If, for example, the means 106 determines that the device 103 is in an active mode (e.g. a phone call is in progress) and thus that the power consumption of said battery is medium (e.g. above said first value and below a second value), then the means 106 may determine to download time-slices corresponding to e.g. number 1, 11, 21, etc. The determined number of time-slices to be downloaded may be supplied from the means 106 for determining a number of time-slices to the means 105 for downloading a number of time-slices in which the determined number of time-slices may be downloaded.

If, for example, the means 106 determines that the device 103 is in a standby mode and that the means for downloading a number of time-slices is already active (e.g. a user is watching a TV-program on the mobile communication device which may otherwise be in a standby mode) such that the power consumption of said battery is medium (e.g. above said first value and below a second value), then the means 106 may likewise determine the number of time-slices to be downloaded to be e.g. the first time-slice of each frame in addition to the one that is already watched e.g. corresponding to time-slices number 1, 11, 21, etc. The determined number of time-slices to download may be supplied from the means 106 for determining a number of time-slices to the means 105 for downloading a number of time-slices in which the determined number of time-slices may be downloaded.

If, for example, the means 106 determines that the device 103 is in an active mode and that the means for downloading a number of time-slices is already active downloading a first set of time-slices (e.g. a user is watching a TV-program on the device which is in an active mode) such that the power consumption of said battery is high (e.g. above said second value), then the means 106 may determine not to download a second set of time-slices to e.g. a memory device in order to not increase power consumption of the mobile communication device. The means 105 for downloading a number of time-slices may in this case continue to download the first set of time-slices.

In an additional embodiment, the means 106 adapted to determine a number of time-slices to be downloaded based on a charge state of the battery 104 is further adapted to use a signal to noise ratio (SNR) of the data received from the transmitter 101 as an indication of the power consumption of the device 103.

If reception conditions of the mobile communication device are good, e.g. a substantially stationary device 103 and/or the device being in proximity to the transmitter 101, then the SNR may be good and thus the power consumption of the means 105 for downloading a number of time-slices may be low. If reception conditions of the mobile communication device are bad, e.g. a substantially fast moving device 103 and/or large distance between transmitter 101 and the device 103, then the SNR may be bad and thus the power consumption of the means 105 for downloading a number of time-slices may be high. The use of SNR as an indication of the power consumption of the device 103 is possible, because, for example, a decoder of the means 105 for downloaded a number of time-slices, e.g. a Reed-Solomon decoder in a DVB-H receiver, may not be required to perform any (or only a few) error corrections in case of a good SNR since there are no (or only few) errors to correct and thus the decoder does not consume (much) power. Thus, in case of good SNR, the decoder consumes less power and therefore the means 105 for downloading a number of time-slices may use the additional power to download a number of time-slices and therefore the number of time-slices to download may be increased.

Alternatively, in case of bad SNR, the decoder may be required to perform some (or many) error corrections and thus the decoder consumes some (or much) power. Thus, in case of bad SNR, the decoder consumes power and therefore the means 105 for downloading a number of time-slices may not use additional power and thus the number of time-slices to download is maintained or decreased.

In an additional embodiment, if the mobile communication device 103 is substantially stationary or moving at a low speed, a channel over which the device 103 receives one or more broadcast signals from a transmitter 101 may vary slowly and thus a required channel estimation in the device 103 may be simplified and thereby a less complex channel estimation algorithm may be utilized which in return requires less power. Thus, the means 105 for downloading a number of time-slices may use the additional power for downloading a number of time-slices and therefore the number of time-slices to be downloaded may be increased.

In an additional embodiment, the mobile communication device 103 may further comprise a memory device 107 such as for example a RAM, DRAM, flash memory, and/or any other type of memory device. The memory device 107 may for example be electrically connected to e.g. the means for downloading a number of time-slices 105 such that the means for downloading a number of time-slices may store one or more time-slices in the memory device 107.

If services are transmitted in carrousel (for example news, stock information, etc.) and are downloaded by the means for downloading a number of time-slices 105, then only the latest version of the service is stored in the memory 107. Alternatively, different versions of a service sent in carrousel may be stored in the memory 107. Alternatively, all downloaded services are stored in the memory 107. The amount of service-versions to store in the memory 107 may be determined by e.g. the size of the memory unit 107 and/or the free memory size.

In general, if data corresponding to two time-slices are to be downloaded concurrently e.g. a first and a second time-slice in a frame, then it is advantageous to download two adjacent time-slices in order to reduce a synchronization time e.g. the first and the second time-slices; the second and the third time-slices; the third and the fourth time-slices, etc. By choosing two adjacent time-slices, only one synchronization time may be required per two time-slices.

If more than two time-slices are to be downloaded, e.g. N time-slices, then downloading is performed by first downloading time-slices 1, 2, . . . , N in a first frame and subsequently time-slices N+1, N+2, . . . , 2N in a second frame and so on.

The means 106 for determining a number of time-slices to be downloaded may determine said number of time-slices to be downloaded based on statistical data of a user's switching behaviour. For example, if the user switches from a first TV-program to second TV program, then the user may be likely to soon switch back to the first TV program or to switch to a third TV-program. In this situation, a high number (e.g. 4 or 5) of time-slices may be determined to be received and subsequently received by the receiver i.e. resulting in a higher power consumption due to the high number of received time-slices. If the user has been watching the first TV-program for a (long) period of time, e.g. the user has not switched to a second TV program for a period of time, it is less likely that the user will switch to a second TV-program e.g. during the next frame and in this situation, a low number of time-slices (e.g. 1 or 2) may be determined to be received and subsequently received by the receiver i.e. resulting in a lower power consumption due to the low number of received time-slices.

Figure 3:
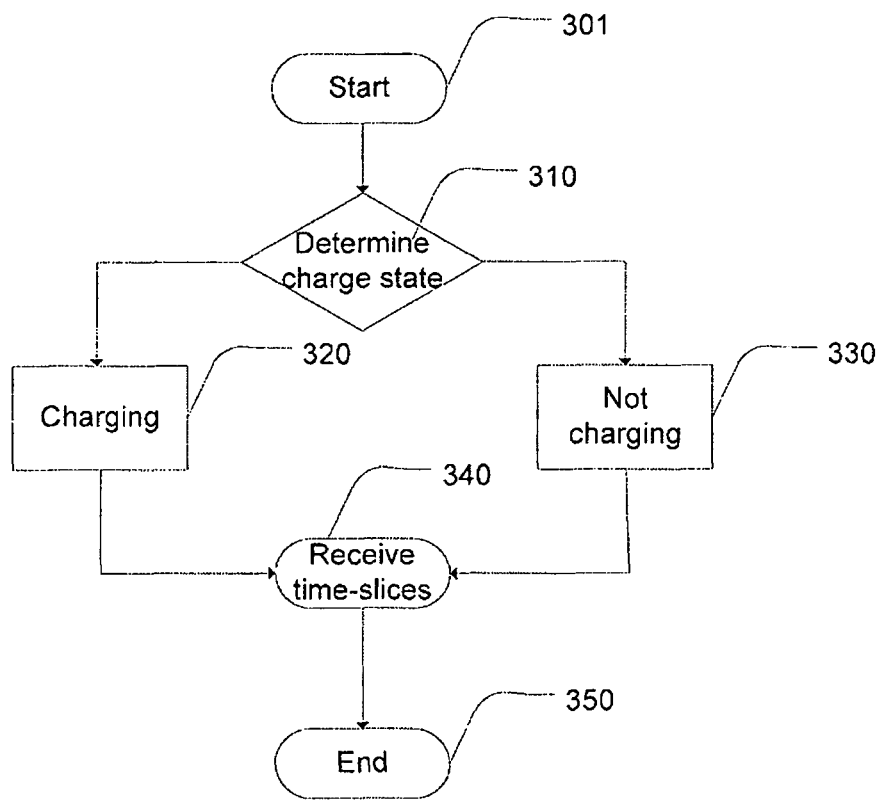
FIG. 3 shows a flow chart representing a method for receiving a number of time-slices in a mobile communication device.

In FIG. 3, a flow-chart diagram of an embodiment of the invention is shown. The flow-chart represents a method for receiving data in a mobile communication device comprising a battery in a broadcast system transmitting data in time-slices. The method represented by the flow chart starts in step 301. In step 310, the method determines a charge state of the battery 104. In step 320, if the charge state of the battery for example indicates that the mobile communication device is connected to a charger (108), a first number of time-slices to be received is then determined, e.g. by determining all time-slices to be received. In step 330, if the charge state of the battery for example indicates that the mobile communication device is not connected to a charger (108), a second number of time-slices to be received is then determined, e.g. by determining half of the time-slices to be received. In step 340, the determined number of time-slices, e.g. the first number or the second number of time-slices, is received by the mobile communication device. In step 350, the method ends.

In the above and below, the term time-slice has been used in relation to a DVB-H system. However, the term time-slice may be interpreted broader such that, for example, all systems using time-slicing or similar partitioning of the data transmitted may be covered by the invention.

Likewise, the term part of an amount of data may, for example, be chosen from the group of parts consisting of 0%, 25%, 50%, 75% and 100%. Alternatively, the part of an amount of data may correspond to any portion of the amount of data. The part of the amount of data may, for example, represent a part of an amount of time. Alternatively, the part of the amount of data may, for example, represent an amount of bandwidth.

Figure 4:
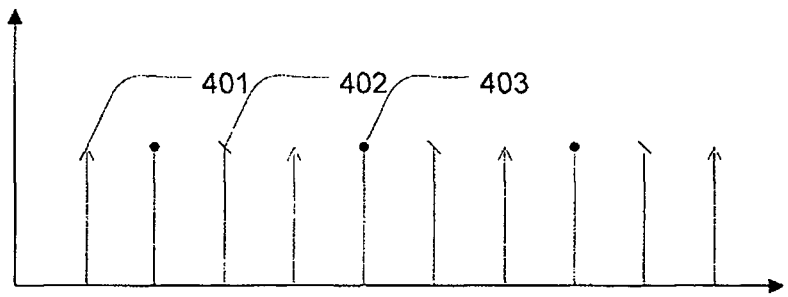
FIG. 4 shows a schematic diagram of sub-carriers in an OFDM system representing different services.

In the above, time-sliced systems have been covered. However, also non-time-sliced systems may be used in the invention. Instead of selecting a number of time-slices to be received as described above, the receiver 105 may, for example, be restricted to receive a certain part of a transmitted bandwidth e.g. a certain number of sub-carriers in an Orthogonal Frequency Division Multiplexing system. FIG. 4 shows data (401, 402, 403) transmitted in an Orthogonal Frequency Division Multiplexing (OFDM) system, 400. In this embodiment, different services such as for example different TV-programs may be located in different sets of sub-carriers (401, 402, 403) of the plurality of sub-carriers of the digital multi-carrier modulation system such that, for example, a first service is located in the sub-carriers 401, a second service in sub-carriers 402, etc.

Figure 5:
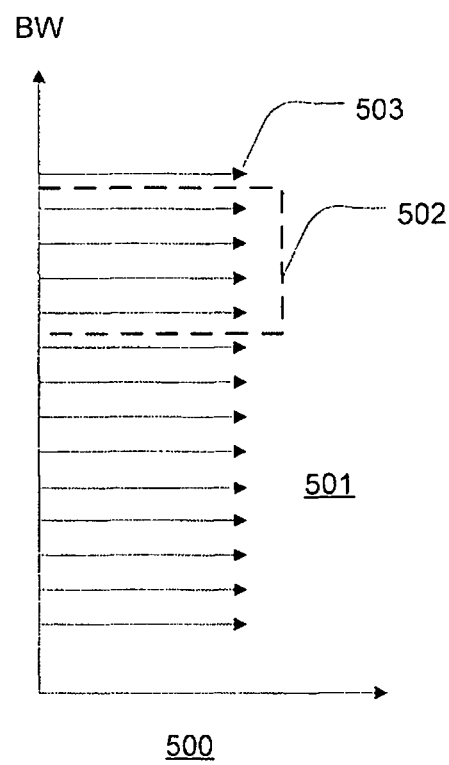
FIG. 5 shows a schematic diagram of sub-carriers in an OFDM system representing different services in a different way.

In an additional embodiment, represented by FIG. 5, an OFDM system 500 transmits sub-carriers 501. The sub-carriers may again represent a number of services. In this embodiment, a service may be located in a sub-set of the sub-carriers such as for example 502, while other sub-carriers are used by other services. The sub-set of sub-carriers 502 and the corresponding services may be selected for download instead of downloading all sub-carriers, i.e. the full bandwidth. Receiving a reduced bandwidth means that the sampling rate at which a mobile communication device downloads/receives data may be reduced proportionally. The power consumption of the mobile communication device is typically proportional to the sampling rate, and thus by downloading a reduced bandwidth the power consumption is chosen according to a charge state of the battery of the mobile communication device.

If a mobile communication device in an OFDM system transmitting data as disclosed above, for example, is connected to a battery charger, then battery capacity may not be an issue for the mobile communication device, and thus the mobile communication device may, for example, download/receive data corresponding to all services i.e. the mobile communication device may, for example, download all the sub-carriers (401, 402 and 403; 501). Thus, in case the mobile communication device is connected to a charger, the mobile communication device may determine to download at full bandwidth.

If the mobile communication device is not connected to a charger, the remaining battery capacity may, for example, determine the amount of bandwidth to download/receive. If, for example, the battery is substantially fully charged, the mobile communication device may, for example, download subcarriers corresponding to e.g. two TV programs (401, 402; 502). If, for example, the remaining capacity of the battery is substantially 50% of the full capacity of the battery, then the mobile communication device may, for example, download one service e.g. the TV program represented by the set of sub-carriers 402; 503. Thereby, the mobile communication device may download at reduced bandwidth if the battery capacity of the device is not substantially fully charged.

If the remaining capacity of the battery is below 50% of the full battery capacity, the mobile communication device may determine not to download any sub-carriers i.e. not to download any services.

As disclosed above in relation to time-slices, the mobile communication device may also base the amount of sub-carriers to download on, for example, the power consumption of the mobile communication device.

Although various embodiments of the present invention have been described and shown, the invention is not restricted thereto, but may also be embodied in other ways within the scope of the subject-matter defined in the following claims.

In general, any of the technical features and/or embodiments described above and/or below may be combined into one embodiment. Alternatively or additionally any of the technical features and/or embodiments described above and/or below may be in separate embodiments. Alternatively or additionally any of the technical features and/or embodiments described above and/or below may be combined with any number of other technical features and/or embodiments described above and/or below to yield any number of embodiments.

In device claims enumerating several means, several of these means can be embodied by one and the same item of hardware. The mere fact that certain measures are recited in mutually different, dependent claims or described in different embodiments does not indicate that a combination of these measures cannot be used to advantage.

It should be emphasized that the term "comprises/comprising" when used in this specification is taken to specify the presence of stated features, integers, steps or components, but does not preclude the presence or addition of one or more other features, integers, steps, components or groups thereof.

The invention claimed is:

1. A method for receiving data in a mobile communication device in a broadcast system in which an amount of data representing a plurality of services is transmitted; said mobile communication device having a battery; wherein the method comprises the steps of:

receiving a part of said amount of data;

determining said part of said amount of data based on a charge state of said battery;

wherein the step of determining said part of said amount of data based on said charge state of said battery further comprises the steps of:

determining said part of said amount of data to be equal to a first part of said amount of data representing a first set of services of said plurality of services, if said charge state of said battery indicates that said battery is connected to a battery charger; and determining said part of said amount of data to be equal to a second part of said amount of data representing a second set of services of said plurality of services, if said charge state of said battery indicates that said battery is not connected to said battery charger.

2. The method according to claim 1, wherein the step of determining said part of said amount of data based on said charge state of said battery is based on an amount of remaining battery capacity.

3. The method according to claim 2, wherein the step of determining said part of said amount of data based on said amount of remaining battery capacity comprises the steps of:

determining said part of said amount of data to be equal to a third part of said amount of data representing a third set of services of said plurality of services, if said charge state of said battery indicates that said battery has a remaining battery capacity higher than or equal to a first amount of a total capacity thereof; and determining said part of said amount of data to be equal to a fourth part of said amount of data representing a fourth set of services of said plurality of services, if said charge state of said battery indicates that said battery has a remaining battery capacity lower than said first amount of said total capacity.

4. The method according to claim 1, wherein the step of determining said part of said amount of data based on said charge state of said battery is performed in dependence of a power consumption of said mobile communication device on said battery.

5. The method according to claim 4, wherein the step of determining said part of said amount of data based on said charge state of said battery further comprises the steps of:
- determining said part of said amount of data to be in a first range of parts of said amount of data, said first range comprising a highest value and a lowest value of said first range, if said mobile communication device is in a standby mode indicative of a power consumption below or equal to a first value; and
- determining said part of said amount of data to be in a second range of parts of said amount of data, said second range comprising a highest value and a lowest value of said second range, if said mobile communication device is in an active mode indicative of a power consumption above said first value.

6. The method according to claim 5, wherein the method further comprises, if said mobile communication device is in said standby mode, the step of determining said part of said amount of data to be equal to said lowest value of said first range, if a receiver of said mobile communication device is active.

7. The method according to claim 5, wherein the method further comprises, if said mobile communication device is in said active mode, the step of determining said part of said amount of data to be substantially equal to said lowest value in said second range, if a receiver of said mobile communication device is active.

8. The method according to claim 4, wherein the step of determining of said part of said amount of data performed in dependence of said power consumption of said mobile communication device on said battery further comprises the steps of:
- determining said part of said amount of data to be equal to a fifth part of said amount of data representing a fifth set of services of said plurality of services, if said charge state of said battery indicates that said mobile communication device has a power consumption higher than or equal to a second power consumption; and
- determining said part of said amount of data to be equal to a sixth part of said amount of data representing a sixth set of services of said plurality of services, if said charge state of said battery indicates that said mobile communication device has a power consumption below said second power consumption.

9. The method according to claim 4, wherein the method comprises using a signal to noise ratio of said data received by said mobile communication device from said broadcast system as an indication of said power consumption of said mobile communication device.

10. The method according to claim 1, wherein the method further comprises the step of storing said received part of said amount of data in a memory device of said mobile communication device.

11. The method according to claim 1, wherein the step of determining said part of said amount of data based on said charge state of said battery is further based on statistical data representing a service-switching behavior of a user using said mobile communication device.

12. The method according to claim 1, wherein said amount of data is transmitted as time slices and said part of said amount of data is a number of time slices.

13. The method according to claim 12, wherein said broadcast system is adapted to transmit said amount of data according to a Digital Video Broadcast-Handheld (DVB-H) standard.

14. The method according to claim 1, wherein said amount of data is transmitted as an amount of bandwidth and said part of said amount of data is an amount of bandwidth.

15. The method according to claim 14, wherein said broadcast system is adapted to transmit said amount of data according to an Orthogonal Frequency Division Multiplexing (OFDM) standard.

16. A device for receiving data in a broadcast system in which an amount of data representing a plurality of services is transmitted, said device comprising:
- a battery and means for receiving a part of said amount of data;
- means adapted to determine said part of said amount of data based on a charge state of said battery, wherein said means is adapted to determine said part of said amount of data based on said charge state of said battery and further adapted to determine said part of said amount of data to be equal to a first part of said amount of data representing a first set of services of said plurality of services, if said charge state of said battery indicates that said battery is connected to a battery charger and determine said part of said amount of data to be equal to a second part of said amount of data representing a second set of services of said plurality of services, if said charge state of said battery indicates that said battery is not connected to said battery charger.

17. The device according to claim 16, wherein said means adapted to determine said part of said amount of data based on said charge state of said battery is further adapted to determine said part of said amount of data based on an amount of remaining battery capacity.

18. The device according to claim 17, wherein said means adapted to determine said part of said amount of data based on said charge state of said battery is further adapted to determine said part of said amount of data based on said amount of remaining battery capacity and further adapted to determine said part of said amount of data to be equal to a third part of said amount of data representing a third set of services of said plurality of services, if said charge state of said battery indicates that said battery has a remaining battery capacity higher than or equal to a first amount of a total capacity thereof; and
- determine said part of said amount of data to be equal to a fourth part of said amount of data representing a fourth set of services of said plurality of services, if said charge state of said battery indicates that said battery has a remaining battery capacity lower than said first amount of said total capacity.

19. The device according to 16, wherein said means adapted to determine said part of said amount of data based on said charge state of said battery is further adapted to determine said part of said amount of data based on a power consumption of said device on said battery.

20. The device according to claim 19, wherein said means adapted to determine said part of said amount of data based on said charge state of said battery is further adapted to determine said part of said amount of data to be in a first range of parts of said amount of data said first range comprising a highest value and a lowest value of said first range, if said device is in a standby mode indicative of a power consumption below or equal to a first value; and
- determine said part of said amount of data to be in a second range of parts of said amount of data said second range comprising a highest value and a lowest value of said second range, if said device is in an active mode indicative of a power consumption above said first value.

21. The device according to claim 20, wherein said means adapted to determine said part of said amount of data based on said charge state of said battery is, if said device is in said standby mode, further adapted to determine said part of said amount of data to be equal to said lowest value of said first range, if a receiver of said device is active.

22. The device according to claim 20, wherein said means adapted to determine said part of said amount of data based on said charge state of said battery is, if said device is in said active mode, further adapted to determine said part of said amount of data to be equal to said lowest value in said second range, if a receiver of said device is active.

23. The device according to claim 19, wherein said means is adapted to determine said part of said amount of data based on said power consumption of said battery and further adapted to determine said part of said amount of data to be equal to a fifth part of said amount of data representing a fifth set of services of said plurality of services, if said charge state of said battery indicates that said device has a power consumption higher than or equal to a second power consumption; and determine said part of said amount of data to be equal to a sixth part of said amount of data representing a sixth set of services of said plurality of services, if said charge state of said battery indicates that said device has a power consumption below said second power consumption.

24. The device according to claim 19, wherein said means adapted to determine said part of said amount of data based on said charge state of said battery is further adapted to use a signal to noise ratio of said data received by said device from said broadcast system as an indication of said power consumption of said device.

25. The device according to claim 16, wherein said device further comprises a memory device adapted to store said part of said amount of data received from said broadcast system.

26. The device according to claim 16, wherein said means adapted to determine said part of said amount of data based on said charge state of said battery is further adapted to determine said part of said amount of data received based on statistical data representing a service-switching behavior of a user using said device.

27. The device according to claim 16, wherein said amount of data is transmitted as time slices and said part of said amount of data is a number of time slices.

28. The device according to claim 27, wherein said broadcast system is a Digital Video Broadcast-Handheld (DVB-H) system.

29. The device according to claim 16, wherein said amount of data is transmitted as an amount of bandwidth and said part of said amount of data is an amount of bandwidth.

30. The device according to claim 29, wherein said broadcast system is an Orthogonal Frequency Division Multiplexing (OFDM) system.

31. The device according to claim 16, wherein said device is a mobile phone.

\* \* \* \* \*

UNITED STATES PATENT AND TRADEMARK OFFICE
CERTIFICATE OF CORRECTION

| | | |
|---|---|---|
| PATENT NO. | : 8,929,959 B2 | Page 1 of 1 |
| APPLICATION NO. | : 12/597217 | |
| DATED | : January 6, 2015 | |
| INVENTOR(S) | : Pamp et al. | |

It is certified that error appears in the above-identified patent and that said Letters Patent is hereby corrected as shown below:

On the Title Page, References Cited, in Item (56), under "OTHER PUBLICATIONS", in Column 2, Line 1, delete "et al:" and insert -- et al.: --, therefor.

In the Specification

In Column 4, Line 20, delete "data," and insert -- data. --, therefor.

In Column 7, Line 21, delete "invention:" and insert -- invention; --, therefor.

In Column 8, Line 42, delete "transmitter 102." and insert -- transmitter 101. --, therefor.

In Column 9, Line 16, delete "battery 106" and insert -- battery 104 --, therefor.

In Column 10, Line 25, delete "battery 106" and insert -- battery 104 --, therefor.

In the Claims

In Column 16, Line 57, in Claim 20, delete "data" and insert -- data, --, therefor.

In Column 16, Line 62, in Claim 20, delete "data" and insert -- data, --, therefor.

Signed and Sealed this
Twenty-third Day of June, 2015

Michelle K. Lee
*Director of the United States Patent and Trademark Office*